Feb. 7, 1967   L. R. GRABOWSKI   3,302,477
NUT AND SCREW ASSEMBLY
Filed Nov. 23, 1964   2 Sheets-Sheet 2

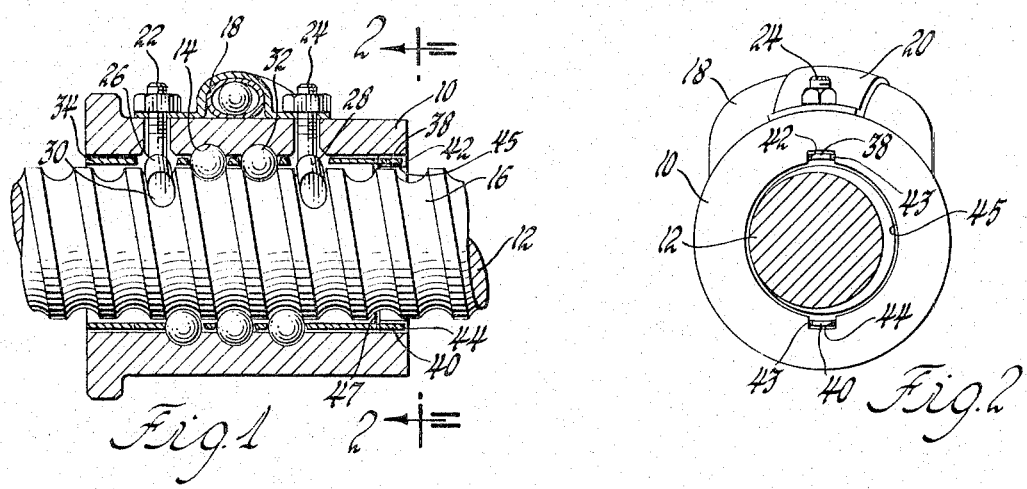
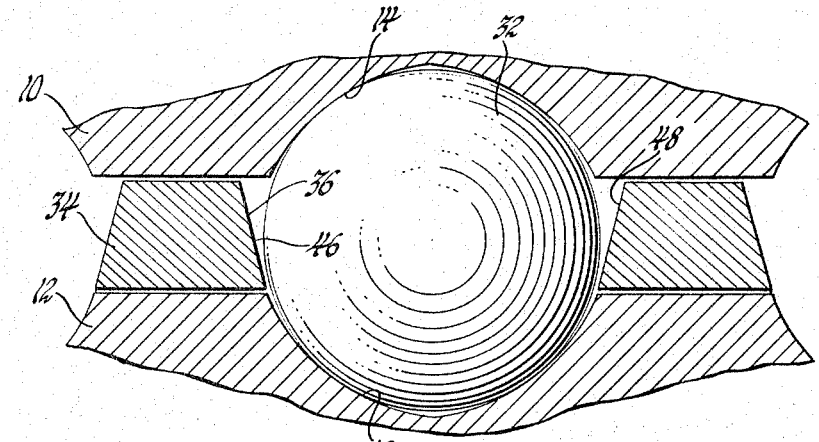
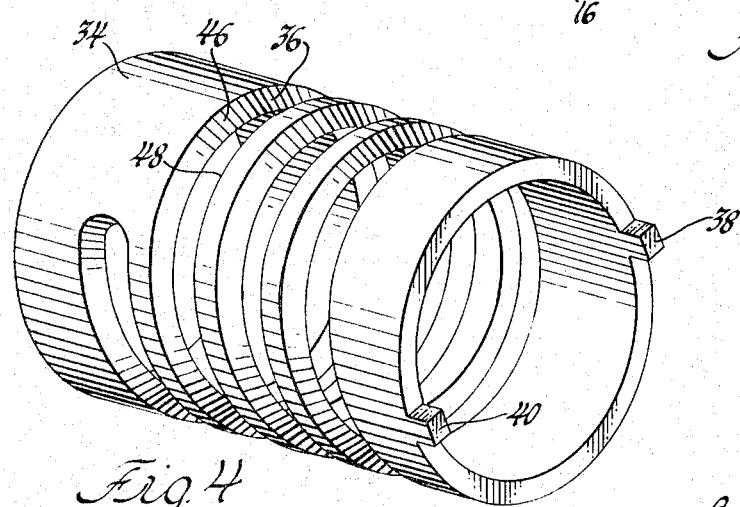

INVENTOR.
Leonard R. Grabowski
BY
A. M. Heiter
ATTORNEY

United States Patent Office 3,302,477
Patented Feb. 7, 1967

3,302,477
NUT AND SCREW ASSEMBLY
Leonard R. Grabowski, Bay City, Mich., assignor to General Motors Corporation, Detroit, Mich., a corporation of Delaware
Filed Nov. 23, 1964, Ser. No. 413,058
18 Claims. (Cl. 74—424.8)

This invention relates to a ball nut and screw assembly and more particularly to a ball retainer for retaining the balls on either the nut or screw prior to nut and screw assembly.

Ease in assembly of a ball nut and screw is provided by having the balls retained by a ball retainer on the nut or screw prior to final assembly as is well known to those in this art. While the ball retainers of the prior art have proven generally satisfactory, they often do not meet the required standards of noninterference with ball movement during nut and screw operation and impose costly modifications on existing ball nut and screw structures generally because of limited space accommodations for the ball retainer and the manner of securing the ball retainer to the nut or screw.

The principle of this invention lies in the provision of a slotted ball retainer sleeve mounted in an accommodating annular space between the nut and screw members whose slot for ball retention is assured against dictating ball travel during nut and screw operation. The balls, which are loaded in the assembly's helical race provided by complementary helical ball grooves on the nut and screw members and recirculated by ball return means on one of the members, are received in a helical slot in the sleeve having a lead matching that of the ball grooves. The opposite side walls of the slot are sufficiently wide apart to permit the balls to extend therethrough for drive transmittal between the nut and screw members and are also sufficiently close enough to retain the balls on the member having the ball return means when the nut and screw members are disconnected. The ball retainer sleeve is keyed at one end to the member having the ball return means through a tongue and groove connection. This connection makes assembly of the sleeve easy and allows for slight inaccuracies in alignment between the retainer slot and the ball grooves by permitting limited relative angular movement of the ball retainer sleeve during nut and screw operation to properly align the slot to prevent the slot from dictating ball position in the race which would interfere with nut and screw operation. In addition, the ball retainer sleeve is retained on the member having the ball return means by the balls occupying the slot, relative angular movement of the sleeve being limited by the tongue and groove connection, to provide a simple manner of sleeve retention.

An object of this invention is to provide in a ball nut and screw assembly, ball retaining means retained on one of the nut and screw members having a helical slot through which the balls extend for drive transmittal narrower than the diameters of the balls to retain the balls on the one member prior to nut and screw member assembly.

Another object of this invention is to provide in a ball nut and screw assembly a ball retainer sleeve accommodated in the annular space between the nut and screw members, the ball retainer sleeve having a helical slot maintainable in alignment with the ball grooves of the nut and screw members during nut and screw operation, the slot having a width sufficiently wide to enable the balls to extend therethrough for drive transmittal and sufficiently narrow to retain the balls on one of the members to which the ball retainer sleeve is connected when the nut and screw members are disconnected.

Another object of this invention is to provide in a ball nut and screw assembly a ball retainer sleeve having a closed end helical slot having a lead matching the lead of the helical ball grooves of the nut and screw members, the balls being recirculated by ball return means on one member and having diameters larger than the slot width and extending through the slot for drive transmittal and means for permitting only limited angular movement of the sleeve relative to the one member to align the slot with the ball grooves through ball contact during nut and screw operation.

These and other objects of the invention will be more apparent from the following description and drawing in which:

FIGURE 1 is a longitudinal view with parts in section showing one embodiment of a ball nut and screw assembly constructed according to this invention.

FIGURE 2 is a view taken on the line 2—2 in FIGURE 1.

FIGURE 3 is an enlarged view of a portion of FIGURE 1.

FIGURE 4 is an enlarged perspective view of the ball retainer sleeve.

Figure 5:
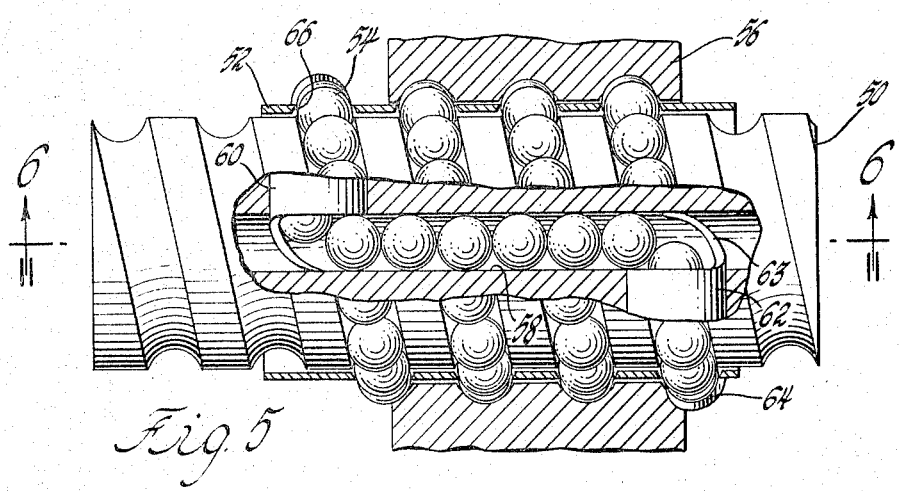
FIGURE 5 is a longitudinal view with parts in section showing a second embodiment of a ball nut and screw assembly constructed according to this invention.

Referring first to the embodiment shown in FIGURE 1, the ball nut and screw assembly there shown comprises a nut member 10 and a screw member 12 having complementary helical ball grooves 14 and 16 respectively providing a helical passage or race. A conventional ball return tube 18 secured by a clamp 20 and bolts 22 and 24 to nut member 10 has its opposite ends extending through apertures in nut member 10 to cooperate with the helical passage to provide an endless ball circuit for ball circulation during ball nut and screw operation. The bolts 22 and 24 have arcuate heads 26 and 28 respectively located within the helical passage having deflector faces, such as face 30 on head 26, which lie on a plane preferably tangent to the helical passage to deflect the balls to and from the helical passage to and from the return passage provided by the return tube in the conventional manner.

An endless train of balls 32 fills the endless ball circuit and, as is well understood in the art, if one of the members 10 and 12 is held against axial movement and is free to be rotated relative to the other, such other member will be caused to move linearly if restrained against rotary movement through the helical drive provided by the balls 32 as they travel under loaded conditions in the helical passage to provide drive transmittal between these members.

A cylindrical ball retainer sleeve 34 as best shown in FIGURE 3 is mounted within the annular space between nut member 10 and screw member 12, this space being made slightly larger than normal and the sleeve has a closed end and tapered helical slot 36 through which the balls extend sufficiently to engage ball grooves 14 and 16 for proper operation as shown in FIGURES 1 and 3. Diametrically opposed tongues 38 and 40 provided on one end of sleeve 34 are received in accommodating axially extending grooves 42 and 44 respectively provided in a reduced diameter bore 45 of nut member 10. The opposite sides of tongues 38 and 40 engage the sides of grooves 42 and 44 respectively to prevent relative angular movement between sleeve 34 and nut member 10. The ball deflector heads 26 and 28 are also received by slot 36 at its opposite ends. However, these heads preferably do not engage the ends of slot 36 for reasons which will become more apparent.

The opposite side walls 46 and 48 of slot 36 converge in the direction of the nut and screw member's axes, as best shown in FIGURE 3, to provide the opening of slot 36 at the sleeve's inner radius with a width less than the diameters of balls 32 so that with screw member 12 removed from nut member 10 balls 32 are retained by the side walls 46 and 48 in the ball groove 14 in nut member 10. This enables the balls 32 to be assembled and retained in the return passage and the ball groove 14 prior to final assembly of nut member 10 and screw member 12. The balls 32 when so assembled act to retain sleeve 34 within nut member 10 since tongues 38 and 40 prevent relative rotation and balls 32 prevent relative axial movement of sleeve 34 relative to nut member 20. This provides a simple manner of retaining the sleeve 34 within nut member 10.

It is important that sleeve 34 not dictate the position of the balls during nut and screw operation since this would reduce the efficiency of nut and screw operation. This is prevented by proper alignment of slot 36 with ball grooves 14 and 16 through accurate location of the tongue and groove connections. Tolerances are an important factor and slight misalignment of the ball retaining slot can result especially in mass production. To assure proper slot alignment tongues 38 and 40 preferably have a selected clearance 43 in grooves 42 and 44 respectively as shown in FIGURE 2 and there is provided a clearance 47 between the tongued end of sleeve 34 and the step of bore 45 as shown in FIGURE 1 with the sleeve in its centered position. The tongues 38 and 40 thus permit some angular play of a few degrees between sleeve 34 and nut member 10 during all nut and screw operation so that sleeve 34 will position itself through slot wall contact with the balls to always align slot 36 with the complementary ball grooves 14 and 16, any sleeve movement rightwardly being permitted by clearance 47. This is the preferred manner of permitting limited play of sleeve 34 and it will be recognized that limited sleeve play may also be accomplished by providing limited clearance between heads 26 and 28 and the opposite ends of slot 36 where it is desired to reduce the number of manufacturing operations by excluding the tongue and groove connection.

Figure 6:
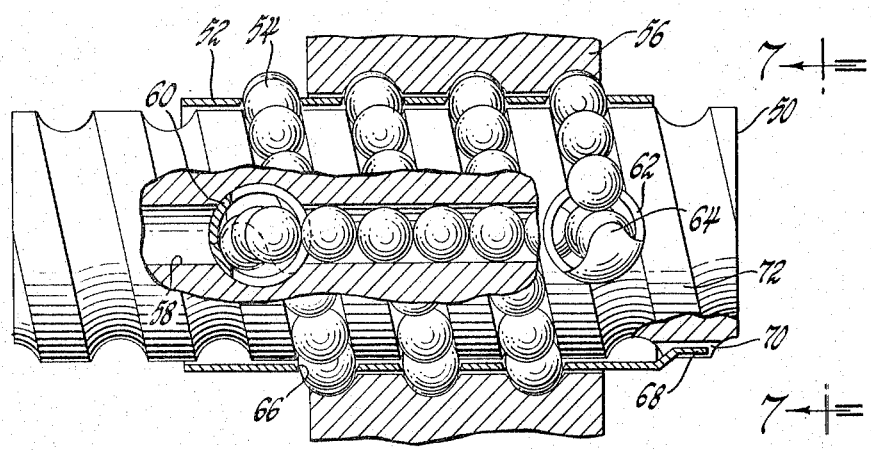
FIGURE 6 is a view taken substantially on the line 6—6 in FIGURE 5.
Figure 7:
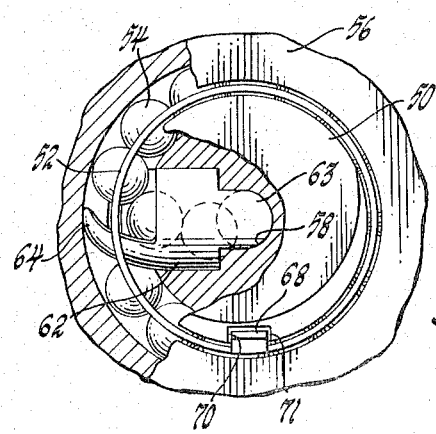
FIGURE 7 is a view taken on the line 7—7 in FIGURE 6.

In the second embodiment shown in FIGURES 5, 6 and 7 the ball return passage is provided in the screw member 50 and the ball retainer sleeve 52 retains the balls 54 at assembly in the screw member ball groove and return passage prior to final assembly of the nut member 56 and also during operation when required.

The return passage is provided by an axially extending bore 58 in the screw member which is intersected at axially spaced points by radial bores which meet with the screw member ball groove and accommodate press fitted ball deflector tubes 60 and 62. Each deflector tube, such as tube 62, has at one end a depending ball deflector finger 63 extending into bore 58 contoured to provide a smooth arcuate path for ball travel between bore 58 and the tube. A depending ball deflector finger 64 at the opposite tube end extends radially outward of the screw member ball groove through the sleeve slot 66 and is contoured to provide a slight overhanding smooth arcuate path for ball travel between the tube and screw member ball groove. Thus, both tubes together with bore 58 will cooperate with the helical passage provided by the nut and screw members ball grooves to provide the endless ball circuit for ball circulation.

The helical slot 66 of sleeve 52 is constructed like tapered slot 36 except that the side walls converge in a direction away from the nut and screw member's axes to provide the opening of slot 66 at the sleeve's outer radius with a width less than the diameters of the balls. Thus, the balls can be assembled and retained in the return passage and the screw member ball groove with the nut member removed.

A tongue 68 bent radially inwardly from sleeve 52 is received by a groove 70 cut in the screw groove land 72 for sleeve retention on the screw member through cooperation with the contact between the balls and slot walls. The selected tongue and groove clearance 71 permits some angular play like tongues 38, 40 and grooves 42, 44 during nut and screw operation to maintain proper ball retaining slot and helical passage alignment. This is the preferred manner of permitting limited play of sleeve 52. Limited sleeve play may also be accomplished by providing limited clearance between the opposite ends of slot 66 and the deflector fingers which extend through the slot where it is desired to exclude the tongue and groove connection.

The tapered wall slots of the ball retainer sleeves shown are preferred since a tapered wall slot permits a greater sleeve thickness for greater sleeve strength over a sleeve having a vertical wall slot for the same sleeve accommodating clearance between the nut and screw members. However, a vertical wall slot may be utilized where it is desired to use a relatively thin wall sleeve having relatively high strength properties.

The above-described preferred embodiments are illustrative of the invention which may be modified within the scope of the appended claims.

I claim:

1. In a ball nut and screw assembly the combination of nut and screw members having complementary helical grooves providing a race, a train of antifriction elements loaded in said race providing a driving connection between said nut and screw members, said nut and screw members having an annular clearance therebetween and antifriction element retaining means mounted in said annular clearance operatively connected to one member and having a helical slot through which said antifriction elements extend, said slot having a width sufficient to retain said antifriction elements in the groove of said one member upon the removal of the other member from said one member.

2. The ball nut and screw assembly set forth in claim 1 and said one member being said nut member.

3. The ball nut and screw assembly set forth in claim 1 and said one member being said screw member.

4. In a ball nut and screw assembly the combination of nut and screw members having complementary helical grooves providing a race, a train of balls loaded in said race providing a driving connection between said nut and screw members, said nut and screw members having an annular clearance therebetween and ball retaining means mounted in said annular clearance operatively connected to one member and having a helical ball retaining slot receiving said balls, said slot having opposite side walls converging in directions of intersection to provide a slot opening adjacent the helical groove of the other member smaller than the diameters of said balls so that said balls are retained in the helical groove of said one member by said side walls when said nut and screw members are disconnected.

5. The ball nut and screw assembly set forth in claim 4 and said one member being said nut member.

6. The ball nut and screw assembly set forth in claim 4 and said one member being said screw member.

7. In a ball nut and screw assembly the combination of nut and screw members having complementary helical grooves providing a helical passage, ball return means carried by one member providing a return passage operatively connected to said helical passage to provide a continuous ball circuit, a train of balls mounted within said ball circuit providing a driving connection in said helical passage between said nut and screw members, said nut and screw members having an annular clearance therebetween and a ball retainer sleeve mounted in said annular clearance operatively connected to said one member having a closed end helical ball retaining slot receiving said balls having a slot width sufficiently large to permit said balls to operate in said race and sufficiently narrow to retain the balls in the helical groove of said one member so that said train of balls is retained on said one member upon removal of the other member.

8. The ball nut and screw assembly set forth in claim 7 and said slot having opposite side walls converging in directions of intersection to provide said slot width.

9. In a ball nut and screw assembly the combination comprising nut and screw members having complementary helical grooves providing a helical passage, ball return means carried by one member providing a return passage operatively connected to said helical passage to provide a continuous ball circuit, a train of balls mounted within said ball circuit providing a driving connection in said helical passage between said nut and screw members, said nut and screw members having an annular clearance therebetween, a ball retainer sleeve mounted in said annular clearance having a closed end helical slot receiving said balls, said slot having a lead matching the lead of said helical passage and a slot width sufficiently large to permit said balls to operate in said helical passage and sufficiently narrow to retain the balls in the helical groove of said one member so that said train of balls is retained on said one member upon removal of the other member and limit means for limiting relative angular movement between said one member and said ball retainer sleeve to a limited degree in which said slot is alignable with said helical passage.

10. The ball nut and screw assembly set forth in claim 9 and said one member being said nut member and said limit means comprising a tongue and groove connection.

11. The ball nut and screw assembly set forth in claim 9 and said one member being said screw member and said limit means comprising a tongue and groove connection.

12. In combination, a cylindrical member having a helical ball groove, said cylindrical member having ball return means providing a return passage operatively connected at opposite ends to said ball groove, a sleeve having a helical slot matching the lead of said ball groove, a train of balls mounted in said ball groove and said return passage and extending through said slot, said slot having a slot width sufficiently narrow to retain the balls in said ball groove and means for preventing relative rotation between said sleeve and said cylindrical member.

13. In combination, a cylindrical member having a helical ball groove, said cylindrical member having ball return means providing a return passage operatively connected at opposite ends to said ball groove and including ball deflector members extending into the opposite ends of said ball groove, ball retaining means operatively connected to said cylindrical member and having a helical ball retaining slot having a lead corresponding to the lead of said ball groove, a train of balls mounted in said ball groove and said return passage and received in said slot, said slot receiving at its opposite ends said deflector members and along its intermediate length having side walls converging in directions away from said ball groove to provide a slot opening smaller than a ball diameter so that said balls are retained in said ball groove by said side walls.

14. In combination, a cylindrical member having a helical ball groove, said cylindrical member having ball return means providing a return passage operatively connected at opposite ends to said ball groove and including ball deflector members located at said opposite ends extending into said ball groove, a sleeve having a helical slot having a lead corresponding to the lead of said ball groove, a train of balls mounted in said ball groove and said return passage and extending through said slot, said slot receiving at its opposite ends said deflector members and along its intermediate length having side walls converging in directions away from said ball groove to provide a slot opening smaller than a ball diameter so that said balls are retained in said ball groove by said side walls and means operatively connecting said sleeve and said cylindrical member permitting limited relative angular movement therebetween to provide alignment of said slot with said ball groove.

15. The combination set forth in claim 14 and said means comprising a tongue and groove connection.

16. In combination, a cylindrical member having a helical ball groove, said cylindrical member having ball return means providing a return passage operatively connected at opposite ends to said ball groove and including ball deflector members located at said opposite ends extending into said ball groove, a sleeve having a helical slot having a lead matching the lead of said ball groove, a train of balls mounted in said ball groove and said return passage and extending through said slot, said slot receiving at its opposite ends said deflector members and having a slot width less than the diameters of said balls to retain said balls in said ball groove and means for preventing only relative angular movement between said cylindrical member and said sleeve whereby said sleeve is retained on said cylindrical member by said means and the balls in said slot and ball groove.

17. The combination set forth in claim 16 and said cylindrical member being a nut member.

18. The combination set forth in claim 16 and said cylindrical member being a screw member.

References Cited by the Examiner
UNITED STATES PATENTS

| | | | |
|---|---|---|---|
| 2,044,663 | 6/1936 | Brodin | 308—201 |
| 2,468,506 | 4/1949 | Millns | 74—459 |

DAVID J. WILLIAMOWSKY, *Primary Examiner.*

L. H. GERIN, *Assistant Examiner.*